(12) United States Patent
Musha et al.

(10) Patent No.: US 9,708,464 B2
(45) Date of Patent: Jul. 18, 2017

(54) RUBBER COMPOSITION, METHOD FOR MANUFACTURING RUBBER-METAL COMPOSITE BODY, RUBBER-METAL COMPOSITE BODY, TIRE, INDUSTRIAL BELT, AND RUBBER CRAWLER

(71) Applicant: BRIDGESTONE CORPORATION, Chuo-ku, Tokyo (JP)

(72) Inventors: Shinichi Musha, Nasushiobara (JP); Junichi Yamagishi, Higashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 208 days.

(21) Appl. No.: 14/386,420

(22) PCT Filed: Mar. 22, 2013

(86) PCT No.: PCT/JP2013/001969
§ 371 (c)(1),
(2) Date: Sep. 19, 2014

(87) PCT Pub. No.: WO2013/140820
PCT Pub. Date: Sep. 26, 2013

(65) Prior Publication Data
US 2015/0050506 A1 Feb. 19, 2015

(30) Foreign Application Priority Data
Mar. 23, 2012 (JP) ................................. 2012-067858

(51) Int. Cl.
| | |
|---|---|
| C08K 5/098 | (2006.01) |
| C23G 1/24 | (2006.01) |
| B32B 37/16 | (2006.01) |
| B32B 38/00 | (2006.01) |
| B60C 1/00 | (2006.01) |
| B62D 55/24 | (2006.01) |
| B65G 15/34 | (2006.01) |
| B60C 9/00 | (2006.01) |

(52) U.S. Cl.
CPC .............. *C08K 5/098* (2013.01); *B32B 37/16* (2013.01); *B32B 38/00* (2013.01); *B60C 1/00* (2013.01); *B62D 55/24* (2013.01); *B65G 15/34* (2013.01); *C23G 1/24* (2013.01); *B32B 2038/0052* (2013.01); *B60C 2001/005* (2013.04); *B60C 2001/0066* (2013.04); *B60C 2009/0021* (2013.04); *Y10T 156/10* (2015.01); *Y10T 428/31678* (2015.04)

(58) Field of Classification Search
CPC .......... C08K 5/098; B62D 55/24; B60C 1/00; B60C 2001/005; B60C 2001/0066; B60C 2009/0021; B32B 37/16; B32B 38/00; B32B 2038/0052; B65G 15/34; C23G 1/24; Y10T 156/10; Y10T 428/31678
See application file for complete search history.

(56) References Cited

U.S. PATENT DOCUMENTS

| | | | | |
|---|---|---|---|---|
| 4,076,668 A | * | 2/1978 | Kaneda | .................. C08J 5/10 156/910 |
| 4,333,785 A | * | 6/1982 | Erickson | ................ B29D 30/48 134/28 |
| 4,572,263 A | * | 2/1986 | Ogawa | ...................... B60C 9/08 152/537 |
| 5,624,764 A | * | 4/1997 | Muraoka | .................. C08J 5/10 428/462 |
| 2002/0045687 A1 | | 4/2002 | Hatano et al. | |
| 2003/0079817 A1 | * | 5/2003 | Miyazaki | ................ B29C 70/00 152/537 |
| 2003/0188818 A1 | * | 10/2003 | Drvol | ........................ B60C 1/00 152/564 |
| 2006/0135660 A1 | * | 6/2006 | Hoopes | ................ C08K 5/3415 524/105 |
| 2007/0149670 A1 | | 6/2007 | Uchida et al. | |
| 2011/0054109 A1 | * | 3/2011 | Sandstrom | ............... C08K 5/09 524/508 |
| 2012/0177944 A1 | * | 7/2012 | Toyosawa | ............. B60C 9/0007 428/621 |

FOREIGN PATENT DOCUMENTS

| | | |
|---|---|---|
| CN | 1240239 A | 1/2000 |
| CN | 1990624 A | 7/2007 |
| EP | 1258338 A2 | 11/2002 |

(Continued)

OTHER PUBLICATIONS

Communication dated Jul. 14, 2015 from the Japanese Patent Office in counterpart application No. 2012-067858.
Communication dated Sep. 28, 2015, issued by the State Intellectual Property Office of the P.R.C. in corresponding Chinese Application No. 201380015960.9.
Communication from The State Intellectual Property Office of PR China dated May 11, 2015 in counterpart Application No. 201380015960.9.
Communication dated Nov. 16, 2015 from the European Patent Office in counterpart application No. 13764809.3.
Database WPI, Week 200966, Thomson Scientific, London, GB; AN 2009-N93583, XP002750394, & JP 2009 215433 A (Bridgestone Corp) Sep. 24, 2009 (Sep. 24, 2009).

(Continued)

*Primary Examiner* — Robert Jones, Jr.
(74) *Attorney, Agent, or Firm* — Sughrue Mion, PLLC

(57) ABSTRACT

A rubber-metal composite body constituted of a rubber composition and a metal material embedded therein is conventionally used in a rubber article requiring high strength in order to reinforce rubber to improve strength and durability thereof. The present invention provides a rubber composition having good initial adhesive properties and good heat resistant adhesive properties with respect to a metal material, mainly for use in the rubber-metal composite body as described above. Specifically, the present invention provides a rubber composition, containing a cobalt compound by an amount, according to cobalt atoms, in the range of 0.0025 to 0.05 parts by mass with respect to 100 parts by mass of a rubber component.

3 Claims, No Drawings

(56) References Cited

FOREIGN PATENT DOCUMENTS

| | | |
|---|---|---|
| JP | 11-189676 A | 7/1999 |
| JP | 2001-233998 A | 8/2001 |
| JP | 2002-013085 A | 1/2002 |
| JP | 2002-069404 A | 3/2002 |
| JP | 2005-139361 A | 6/2005 |
| JP | 2005-343959 A | 12/2005 |
| JP | 2005-343995 A | 12/2005 |
| JP | 2005353959 A | 12/2005 |
| JP | 2007-112835 A | 5/2007 |
| JP | 2007-197673 A | 8/2007 |
| JP | 2007-217492 A | 8/2007 |
| JP | 2009215433 A | 9/2009 |
| JP | 2010254759 A | 11/2010 |
| JP | 2011-057075 A | 3/2011 |
| RU | 2141979 C1 | 11/1999 |
| RU | 2145551 C1 | 2/2000 |
| SU | 1368221 A1 | 1/1988 |
| WO | 9613544 A1 | 5/1996 |
| WO | 2011/030547 A1 | 3/2011 |
| WO | WO2011030547 A1 * | 3/2011 |
| WO | 2012/039476 A1 | 3/2012 |

OTHER PUBLICATIONS

Database WPI Week 201078, Thomson Scientific, London, GB; AN 2010-P00201, XP002750395, & JP 2010 254759 A (Bridgestone Corp), Nov. 11, 2010 (Nov. 11, 2010).
International Search Report for PCT/JP2013/001969 dated May 21, 2013 [PCT/ISA/210].

* cited by examiner

RUBBER COMPOSITION, METHOD FOR MANUFACTURING RUBBER-METAL COMPOSITE BODY, RUBBER-METAL COMPOSITE BODY, TIRE, INDUSTRIAL BELT, AND RUBBER CRAWLER

CROSS REFERENCE TO RELATED APPLICATIONS

This application is a National Stage of International Application No. PCT/JP2013/001969 filed Mar. 22, 2013, claiming priority based on Japan Patent Application No. 2012-067858 filed Mar. 23, 2012, the contents of all of which are incorporated herein by reference in their entirety.

TECHNICAL FIELD

The present invention relates to a rubber composition, a method for manufacturing a rubber-metal composite body, a rubber-metal composite body, a tire, an industrial belt, and a rubber crawler.

BACKGROUND ART

A rubber-metal composite body constituted of a rubber composition and a metal material embedded in the rubber composition is used in a rubber article requiring in particular high strength such as a tire, an industrial belt, a rubber crawler and the like in order to reinforce rubber to improve strength and durability thereof. It is necessary to bond the metal material to the rubber composition stably and firmly to cause a resulting rubber-metal composite body to have a good reinforcing effect, in this regard.

It is widely practiced to carry out what is called "direct vulcanization bonding" of a metal material and a rubber composition, i.e. to coat a metal body such as steel cords each plated with zinc, brass or the like, with a rubber composition containing sulfur, and bond the metal body and the rubber composition to each other simultaneously with vulcanization of the rubber composition, in order to realize good adhesion between the metal material and the rubber composition. For example, PTL 1 discloses that it is possible to obtain a steel cord-rubber composite body having good initial adhesive properties and heat resistant adhesive properties between steel cords and a rubber composition by immersing brass-plated steel cords having specific contents of phosphor and metals such as zinc on the outermost surface thereof in a solution containing a metal salt with pH in the range of 6.1 to 8.0 and then coating the steel cords with a rubber composition and subjecting the resulting composite body to vulcanization. However, the adhesive properties of the steel cord-rubber composite body of PTL 1 still need to be improved in terms of increases in recent years in physical and thermal load applied to such rubber articles as described above.

CITATION LIST

Patent Literature

PTL 1: WO2011/030547

SUMMARY OF THE INVENTION

Technical Problems

In view of the situation described above, an object of the present invention is to provide a rubber composition having good initial adhesive properties and good heat resistant adhesive properties with respect to a metal material.

Further, another object of the present invention is to provide a method for manufacturing a rubber-metal composite body, enabling to obtain a rubber-metal composite body exhibiting good initial adhesive properties and good heat resistant adhesive properties between a metal material and a rubber composition.

Yet further, yet another object of the present invention is to provide a rubber-metal composite body exhibiting good initial adhesive properties and good heat resistant adhesive properties between a metal material and a rubber composition.

Yet further, yet another object of the present invention is to provide a tire, an industrial belt, and a rubber crawler having high durability.

Solution to the Problems

A technique of blending a cobalt compound with a rubber composition has conventionally been used to improve adhesive properties between a rubber composition and a metal material. The inventors of the present invention studied in detail how a content of cobalt affects initial adhesive properties and heat resistant adhesive properties between a metal material and a rubber composition and newly discovered that setting an amount of cobalt with respect to an amount of a rubber component to be in a specific range achieves particularly good results in the aforementioned adhesive properties, thereby completing the present invention. Primary features of the present invention to attain the aforementioned objects thereof are as follows.

A rubber composition of the present invention is characterized in that it contains a cobalt compound by an amount, according to cobalt atoms, in the range of 0.0025 to 0.05 parts by mass with respect to 100 parts by mass of a rubber component.

Advantageous Effect of the Invention

According to the present invention, it is possible to provide a rubber composition having good initial adhesive properties and heat resistant adhesive properties with respect to a metal material.

Further, according to the present invention, it is possible to provide a method for manufacturing a rubber-metal composite body, enabling obtaining a rubber-metal composite body exhibiting good initial adhesive properties and good heat resistant adhesive properties between a metal material and a rubber composition.

Yet further, according to the present invention, it is possible to provide a rubber-metal composite body exhibiting good initial adhesive properties and good heat resistant adhesive properties between a metal material and a rubber composition.

Yet further, according to the present invention, it is possible to provide a tire, an industrial belt, and a rubber crawler having high durability.

DESCRIPTION OF THE EMBODIMENTS (Rubber Composition)

Hereinafter, the present invention will be described in detail by exemplarily showing an embodiment thereof. A rubber composition of the present invention characteristically contains a cobalt compound by an amount, according to cobalt atoms, in the range of 0.0025 to 0.05 parts by mass with respect to 100 parts by mass of a rubber component. The rubber composition constitutes a rubber material of a rubber-metal composite body of the present invention.

[Cobalt Compound]

Examples of the cobalt compound for use in the present invention include cobalt salt of organic acid, cobalt metal complex, and the like. Cobalt salt of organic acid is preferable among these examples. Examples of the cobalt salt of organic acid include cobalt naphthenate, cobalt stearate, cobalt neodecanoate, cobalt rosinate, cobalt versatate, cobalt salt of tall oil acid, cobalt oleiate, cobalt linoleate, cobalt linolenate, cobalt palmitate, and the like. Cobalt salt of $C_{16-18}$ organic acid such as cobalt stearate, cobalt oleiate, cobalt linoleate, cobalt linolenate and cobalt palmitate are preferable among these examples in terms of achieving both of good initial adhesive properties and good heat resistant adhesive properties in a well balanced manner. The cobalt salt of organic acid described above may be a combined salt in which a part of an organic acid has been substituted with boric acid. Examples of the cobalt metal complex include cobalt actylacetonate. The cobalt compounds described above may be used either each solely or in combination of two or more types in the rubber composition of the present invention.

The rubber composition of the present invention contains the cobalt compound described above by an amount, according to cobalt atoms, in the range of 0.0025 to 0.05 parts by mass with respect to 100 parts by mass of a rubber component described below. The rubber composition contains the cobalt compound by an amount, according to cobalt atoms, preferably in the range of 0.0025 to 0.025 parts by mass with respect to 100 parts by mass of the rubber component in terms of good initial adhesive properties and good heat resistant adhesive properties between a metal material and the rubber composition, although the preferable range may vary depending on other process conditions (e.g. pH and the like of a buffer solution used in surface-treatment process described below). Containing the cobalt compound "by an amount according to cobalt atoms" in a specific range represents containing the cobalt compound such that the amount of cobalt atoms included in the cobalt compound satisfies the specific range in the present invention. Satisfactory initial adhesive properties and heat resistant adhesive properties between a metal material and the rubber composition cannot be obtained when the amount of cobalt with respect to 100 parts by mass of the rubber component is less than 0.0025 parts by mass. When the amount of cobalt with respect to 100 parts by mass of the rubber component exceeds 0.05 parts by mass, the initial adhesive properties and the heat resistant adhesive properties may deteriorate and the rubber itself may exhibit poor durability against heat, moisture and oxidation because of an influence of an organic component contained in the cobalt compound.

[Rubber Component]

Type of the rubber component for use in the rubber composition of the present invention is not particularly restricted and examples thereof include natural rubber, polybutadiene rubber, polyisoprene rubber, styrene-butadiene copolymer rubber, acrylonitrile-butadiene copolymer rubber, ethylene-proplylene copolymer rubber, ethylene-propylene-diene terpolymer rubber, butyl rubber, halogenated butyl rubber, alkylated chlorosulfonated polyethylene rubber, isobutylene-isoprene copolymer rubber, polychloroprene rubber, and the like. The rubber component described above may be used either each type solely or in combination of two or more types in the rubber composition of the present invention.

[Other Components]

The rubber composition of the present invention can be appropriately blended with, in addition to the cobalt compounds and the rubber component described above, other components generally employed in the rubber industry unless these other components adversely affect the effect of the present invention. Examples of such other components include vulcanizing agent such as sulfur, fillers such as silica and carbon black, oil component such as process oil, vulcanization accelerator, antioxidant, softener, zinc oxide, stearic acid, and the like.

The rubber composition of the present invention can be manufactured by subjecting these components to kneading and mixing, warming, and extrusion according to the conventional method.

(Method for Manufacturing Rubber-Metal Composite Body)

Next, a method for manufacturing a rubber-metal composite body of the present invention will be described. The method for manufacturing a rubber-metal composite body of the present invention includes: surface treatment process for bringing a metal material into contact with a buffer solution; and bonding process for bonding the metal material subjected to the surface treatment process to the aforementioned rubber composition.

<Surface Treatment Process>

The surface treatment process of the present invention represents a process for bringing a metal material into contact with a buffer solution. Initial adhesive properties and heat resistant adhesive properties between the metal material and the rubber composition can be further improved by bringing the metal material thus subjected to the surface treatment process in advance into contact with the rubber composition. Mechanism of how the adhesive properties of the rubber composition and the metal material are improved is assumed as described below in the method for manufacturing a rubber-metal composite body of the present invention, although the mechanism is not constrained to these or any other specific theories.

The metal material (described below in detail) is often provided with lubricant and antirust agent attached on a surface thereof so that handling of the metal material is made easy and the metal material is protected from corrosion. Further, the metal material often has on a surface thereof metal (copper, zinc or the like) oxides derived from a plated layer constituting the surface. It is assumed that a coating film made of these substances attached to the surface of the metal material disturbs good bonding of the metal material to the rubber composition. Accordingly, the adhesive properties of the metal material and the rubber composition are improved by removal of at least a portion of the coating film existing on the surface of the metal material. It is assumed that in the method for manufacturing a rubber-metal composite body of the present invention a pretreatment of a surface of the metal material by a buffer solution removes at least a portion of the aforementioned coating film existing on the surface of the metal material and adequately activates the surface of the metal material to make the surface suitable for bonding to the rubber composition (i.e. make the composition of the outermost surface of the metal material optimum for bonding to the rubber composition), thereby significantly improving initial adhesive properties between the metal material and the rubber. In this connection, good heat resistant adhesive properties between the metal material and the rubber composition can also be obtained because the buffer solution does not adversely affect the surface of the metal material.

[Metal Material]

Type of the metal material for use in the method for manufacturing a rubber-metal composite body of the present invention is not particularly limited and examples thereof include wire-like, plate-like or chain-like materials made of metal such as iron, steel (stainless steel), lead, aluminum, copper, brass, bronze, Monel metal alloy, nickel, zinc or the like. The metal material may have a plated layer on a surface thereof. Type of the plated layer is not particularly restricted and examples thereof include zinc-plated layer, copper-plated layer, brass-plated layer, and the like. Brass-plated layer is preferable in terms of achieving good initial adhesive properties and good heat resistant adhesive properties with respect to the rubber composition among these examples. A brass-plated layer generally has a proportion based on mass of copper:zinc in the range of 60:40 to 70:30. The metal material described above constitutes a metal material of a rubber-metal composite body of the present invention.

The metal material described above will be explained further in detail by using a metal steel wire as an example thereof. A metal steel wire is a wire-like metal material having steel or iron as a primary component (mass of iron is to exceed 50 mass % with respect to the total mass of the metal steel sire). The metal steel wire may contain other metals than iron described above. Wire diameter of the metal steel wire is preferably in the range of 0.1 mm to 5.5 mm and more preferably in the range of 0.15 mm to 5.26 mm in terms of achieving good workability and durability of the wire. "Wire diameter" of a metal steel wire represents the maximum length measured between two points on the outer periphery of a cross section of the metal steel wire, which cross section is orthogonal to the longitudinal axis of the wire. Configuration of the cross section orthogonal to the longitudinal axis of the metal steel wire is not particularly restricted and may be oval, rectangular, triangular or polygonal, although the configuration is generally circular. In a case where steel cords each formed by intertwining the metal steel wires are used for a carcass and/or a belt of a tire, it is preferable that the cross sectional configuration of the metal steel wire is circular and the wire diameter thereof is in the range of 0.1 mm to 0.5 mm. In a case where steel cords each formed by intertwining the metal steel wires are used for a bead core of a tire, it is preferable that the cross sectional configuration of the metal steel wire is circular and the wire diameter thereof is in the range of 1 mm to 1.5 mm. The metal steel wire may have a plated layer on a surface thereof. Thickness of the plated layer is not particularly limited but generally in the range of 100 nm to 300 nm in a brass plated-layer, for example.

[Buffer Solution]

A buffer solution is used for the surface treatment process in the method for manufacturing a rubber-metal composite body of the present invention. A "buffer solution" represents a solution capable of causing a buffering effect. A "buffering effect" represents an effect of maintaining substantially constant hydrogen ion concentration regardless of addition/removal of acid/base in some degree. When an acid solution or an aqueous solution of metal salt is used as a treatment solution in the surface treatment process, the pH value of the treatment solution may significantly vary by continual production of the rubber-metal composite bodies and/or immersion of the water-rinsed metal material (in a case where the metal material is immersed in the treatment solution, rinsed with water, and then immersed in the treatment solution again) due to dissolution of metal and/or mixing of water from a surface of the metal material. In this regard, the method for manufacturing a rubber-metal composite body of the present invention advantageously uses a buffer solution of which pH does not significantly vary in the surface treatment process thereof.

The pH value of the buffer solution for use in the present invention is preferably in the range of 5.0 to 7.2, more preferably in the range of 5.2 to 7.0, further more preferably in the range of 5.4 to 6.8, and most preferably in the range of 6.0 to 6.8. The buffer solution having pH≥5.0 safely avoids excessive corrosion of the metal material caused by too high acidity. The buffer solution having pH≤7.2 can easily remove a coating film existing on a surface of the metal material. It is possible to maintain good durability of the metal material of the resulting rubber-metal composite body and further improve initial adhesive properties and heat resistant adhesive properties between the metal material and the rubber composition by setting pH of the buffer solution to be in the range of 5.0 to 7.2. Stability of the adhesive properties in storage, i.e. the adhesive properties of the metal material after being surface-treated and left, is also satisfactory when the buffer solution has the pH value in the range of 6.0 to 6.8.

The buffer solution contains at least one type of acid therein. The type of the acid contained in the buffer solution is not particularly restricted but the acid is preferably a weak acid having an acid dissociation constant (pKa) in the range of 4 to 8 in terms of achieving satisfactory adhesive properties between the rubber composition and the metal material and satisfactory durability of the metal material. It is possible to maintain good durability of the metal material of the resulting rubber-metal composite body and further improve initial adhesive properties and heat resistant adhesive properties between the rubber composition and the metal material by making the buffer solution contain at least one type of acid selected from acids each having an acid dissociation constant (pKa) in the range of 4 to 8. Examples of the weak acid include acetic acid, phosphoric acid, phthalic acid, succinic acid, citric acid, carbonic acid, and the like. Acetic acid and phosphoric acid are preferable among these examples. These acids may be used either each solely or in combination of two or more types.

Sodium or potassium is preferable as a metal component contained in the buffer solution. It is preferable that the buffer solution is substantially free of any other metals, transition metals in particular, in terms of making pH adjustment of the buffer solution easy and making the effluent treatment of the buffer solution after completing use thereof easy. The expression that "the buffer solution is substantially free of transition metals" represents that concentration of transition metals in the buffer solution is less than 0.01 mol/l in the present invention. The concentration of transition metals in the buffer solution is preferably equal to or less than 0.005 mol/l and most preferably 0 mol/l in the present invention. The "transition metals" represent metal elements constituted of scandium (Sc) to zinc (Zn) in period 4, including cobalt, yttrium (Y) to cadmium (Cd) in period 5, and lutetium (Lu) to mercury (Hg) of period 6 in the periodic table.

Examples of the buffer solution include acetic acid-sodium acetate buffer solution, sodium dihydrogen phosphate-disodium hydrogen phosphate buffer solution, potassium hydrogen phthalate-sodium hydroxide buffer solution, sodium citrate-sodium hydroxide buffer solution, succinic acid-sodium tetraborate buffer solution, and the like. Acetic acid-sodium acetate buffer solution and sodium dihydrogen phosphate-disodium hydrogen phosphate buffer solution are preferable among these examples in terms of achieving good initial adhesive properties and good heat resistant adhesive properties between the rubber composition and the metal material of the resulting rubber-metal composite body.

It is acceptable to add inorganic salt, alcohol or the like to the buffer solution according to necessity in preparation of the buffer solution unless such additives adversely affect the object of the present invention.

Examples of a method for bringing the metal material into contact with the buffer solution in the surface treatment process in the present invention include spraying the buffer solution onto the metal material and immersing the metal material into the buffer solution. A period of time during which the metal material is kept in contact with the buffer solution (which period of time will be referred to as "surface treatment time" hereinafter) may be changed in an appropriate manner in accordance with pH of the buffer solution. Surface treatment time is generally in the range of 0.5 second to 20 seconds and preferably in the range of 1 second to 15 seconds. Required surface treatment time is naturally short when pH of the buffer solution is low and will be prolonged when pH of the buffer solution is high. Accordingly, it is possible to easily adjust surface treatment time, i.e. minutely adjust the degree of surface treatment of the metal material, by using the buffer solution having a high pH value. The temperature of the buffer solution is preferably in the range of 10° C. to 40° C. and more preferably in the range of 15° C. to 30° C.

<Bonding Process>

The "bonding process" in the present invention represents a process for bonding the metal material subjected to the aforementioned surface treatment process in advance to the rubber composition.

Examples of a method for bonding the metal material subjected to the surface treatment process to the rubber composition include vulcanization-bonding the metal material to the rubber composition under pressure and heating. Although the vulcanization conditions are not particularly restricted, pressure is preferably in the range of 2 MPa to 15 MPa and more preferably in the range of 2 MPa to 5 MPa; temperature is preferably in the range of 120° C. to 200° C. and preferably in the range of 130° C. to 170° C.; and vulcanization time is preferably in the range of 3 minutes to 60 hours.

<Other Processes>

The method for manufacturing a rubber-metal composite body of the present invention may include a rinsing process for washing the metal material brought into contact with the buffer solution, with water, after the surface treatment process and prior to the bonding process. Inclusion of the rinsing process makes it possible to rinse off the buffer solution attached to the metal material to further suppress occurrence of corrosion of the metal material (corrosion of a plated layer in particular). Either deionized water or tap water may be used as water for the rinsing process but deionized water is preferable.

(Rubber-Metal Composite Body)

The rubber-metal composite body of the present invention, manufactured by the aforementioned manufacturing method, exhibits excellent initial adhesive properties and heat resistant adhesive properties between the rubber composition and the metal material.

(Tire, Industrial Belt, Rubber Crawler)

A ply having the aforementioned rubber-metal composite body applied thereto is suitably used for a carcass ply and a belt ply of a tire. Further, the rubber-metal composite body is suitably used for a bead and the like of a tire. Similarly, the aforementioned rubber-metal composite body is suitably used for an industrial belt such as a conveyer belt and a rubber crawler. The tire, the industrial belt and the rubber crawler each using the aforementioned rubber-metal composite body have satisfactory bonding strength between the rubber composition and the metal material, thereby well suppressing exfoliation breakage of the rubber composition and the metal material to have good durability and satisfactorily prolonged product lives even under high load.

EXAMPLES

The present invention will be described in detail by Examples hereinafter. It should be noted that the present invention is not restricted by these Examples.

[Rubber Composition]

Different types of rubber compositions for use in Examples 1 to 14 and Comparative Examples 1 to 3 were each prepared by: adding cobalt stearate by an amount according to cobalt atoms shown in Table 1 to 100 pbm (=parts by mass) of natural rubber, 60 pbm of HAF carbon, 8 pbm of zinc white, 2 pbm of antioxidant ("Nocrac 6C", manufactured by Ouchi Shinko Chemical Industrial Co., Ltd.), 1 pbm of vulcanization accelerator ("Nocceler DZ", manufactured by Ouchi Shinko Chemical Industrial Co., Ltd.), and 5 pbm of sulfur; and subjecting the mixture to kneading and mixing, warming and extrusion according to the conventional method.

[Metal Material]

Brass-plated metal steel wires (mass ratio of copper/zinc of a plated layer=63/37, wire diameter=0.3 mm) were used as a metal material. Steel cords each having 1×3 structure were manufactured by intertwining the metal steel wires.

[Buffer Solution]

Acetic Acid-Sodium Acetate Buffer Solution (Acetic Acid Buffer Solution)

Five types of acetic acid-sodium acetate buffer solutions having different pH values were prepared by dissolving sodium acetate (special grade reagent) in deionized water at the concentration of 0.1 mol/l and then adding acetic acid (special grade reagent) thereto. These buffer solutions were prepared such that substantially no other ions were mixed thereto.

Sodium Dihydrogen Phosphate-Disodium Hydrogen Phosphate Buffer Solution (Phosphoric Acid Buffer Solution)

A sodium dihydrogen phosphate-disodium hydrogen phosphate buffer solution (pH=6.6) was prepared by: dissolving disodium hydrogen phosphate (special grade reagent) in deionized water at the concentration of 0.2 mol/l; separately dissolving sodium dihydrogen phosphate (special grade reagent) in deionized water at the concentration of 0.2 mol/l; and mixing the two solutions at the proportion of 1:1. This buffer solution was prepared such that substantially no other ions were mixed thereto.

<Surface Treatment and Rinsing of Metal Material>

The steel cords were immersed in the corresponding buffer solution at 25° C. for 10 seconds, washed with deionized water for 10 seconds thereafter, and then immediately dried by air (25° C.) blown thereonto.

<Bonding of Metal Material and Rubber Composition, and Evaluation>

Initial Adhesive Properties

Rubber-metal composite body samples, each constituted of a rubber sheet having thickness of 1 mm and the steel cords embedded in the rubber sheet, were each prepared by: juxtaposing the steel cords subjected to the surface treatment and rinsing processes as described above in parallel to each other with intervals (12.5 mm each) therebetween; coating the steel cords thus juxtaposed, with the rubber composition, such that the steel cords were interposed between the rubber composition in the vertical direction; and vulcanizing the composite at 160° C. for 7 minutes so that the rubber composition and the steel cores were bonded to each other. The steel cords were positioned in the middle in the thickness direction of the rubber sheet, in parallel to the rubber sheet surfaces, with intervals (12.5 mm each) therebetween in each of the rubber-metal composite body samples.

atmosphere at 110° C. The steel cords were then pulled out of the rubber-steel cord composite body sample according to ASTM D 2229. A coating rate (0% to 100%), i.e. a proportion of rubber still attached to the steel cords, was determined by visual observation and used as an index indicating heat resistant adhesive properties. Specifically, the coating rate, i.e. the result thus determined, was expressed as an index value relative to the corresponding result of Comparative Example 1 as "100". The larger index value represents the better heat resistant adhesive properties.

TABLE 1

|  |  | Amount of cobalt according to atoms thereof (parts by mass) | Buffer solution Type | pH | Evaluation results (Index) | |
|---|---|---|---|---|---|---|
|  |  |  |  |  | Initial adhesive properties | Heat resistant adhesive properties |
| Examples | 1 | 0.0025 | Acetic acid buffer solution | 5.0 | 115 | 105 |
|  | 2 |  |  | 5.2 | 130 | 130 |
|  | 3 |  |  | 6.6 | 125 | 130 |
|  | 4 |  |  | 7.0 | 110 | 110 |
|  | 5 |  |  | 7.2 | 105 | 110 |
|  | 6 |  | Phosphoric acid buffer solution | 6.6 | 125 | 130 |
|  | 7 | 0.025 | Acetic acid buffer solution | 5.2 | 135 | 130 |
|  | 8 |  |  | 6.6 | 130 | 125 |
|  | 9 |  |  | 7.0 | 115 | 120 |
|  | 10 |  | Phosphoric acid buffer solution | 6.6 | 130 | 125 |
|  | 11 | 0.05 | Acetic acid buffer solution | 5.2 | 120 | 130 |
|  | 12 |  |  | 6.6 | 125 | 125 |
|  | 13 |  |  | 7.0 | 115 | 120 |
|  | 14 |  | Phosphoric acid buffer solution | 6.6 | 125 | 125 |
| Comp. Examples | 1 | 0.1 | Acetic acid buffer solution | 7.4 | 100 | 100 |
|  | 2 | 0 |  | 6.6 | 90 | 90 |
|  | 3 |  |  | 7.4 | 80 | 80 |

The steel cords were then pulled out of each of the rubber-metal composite body samples immediately after the vulcanization according to ASTM D 2229. A coating rate (0% to 100%), i.e. a proportion of rubber still attached to the steel cords, was determined by visual observation and used as an index indicating initial adhesive properties. Specifically, the coating rate, i.e. the result thus determined, was expressed as an index value relative to the corresponding result of Comparative Example 1 as "100". The larger index value represents the better initial adhesive properties.

Heat Resistant Adhesive Properties

Rubber-metal composite body samples, each constituted of a rubber sheet having thickness of 1 mm and the steel cords embedded in the rubber sheet, were each prepared by: juxtaposing the steel cords subjected to the surface treatment and rinsing processes as described above in parallel to each other with intervals (12.5 mm each) therebetween; coating the steel cords thus juxtaposed, with the rubber composition, such that the steel cords were interposed between the rubber composition in the vertical direction; and vulcanizing the composite at 160° C. for 20 minutes so that the rubber composition and the steel cores were bonded to each other. The steel cords were positioned in the middle in the thickness direction of the rubber sheet, in parallel to the rubber sheet surfaces, with intervals (12.5 mm each) therebetween in each of the rubber-metal composite body samples.

Each of these rubber-steel cord composite body samples was subjected to age-degradation for 30 days under nitrogen As is obvious from Table 1, the rubber-metal composite body samples of Examples 1 to 14, each using a rubber composition containing a cobalt compound by an amount, according to cobalt atoms, in the range of 0.0025 to 0.05 parts by mass with respect to 100 parts by mass of the rubber component, unanimously exhibit better initial adhesive properties and heat resistant adhesive properties than the rubber-metal composite body samples of Comparative Examples 1 to 3, thereby confirming a superior effect of the present invention. The sample containing too much cobalt in the rubber composition of Comp. Example 1 and the samples each lacking cobalt in the rubber composition of Comp. Examples 2 and 3 unanimously exhibit poorer initial adhesive properties and heat resistant adhesive properties than the samples of Examples 1 to 14.

The invention claimed is:

1. A method for manufacturing a rubber-metal composite body, comprising:
    a surface treatment process comprising bringing a metal material into contact with a buffer solution for 0.5 second to 20 seconds, the buffer solution being free of cobalt and substantially free of transition metals; and
    a bonding process comprising bonding the metal material subjected to the surface treatment process to a rubber composition containing a cobalt compound in an amount, according to cobalt atoms, in the range of 0.0025 to 0.025 parts by mass with respect to 100 parts by mass of a rubber component and containing no nickel and molybdenum.

2. The method for manufacturing a rubber-metal composite body of claim 1, wherein the pH of the buffer solution is set to be in the range of 5.0 to 7.2.

3. The method for manufacturing a rubber-metal composite body of claim 1, wherein the buffer solution contains at least one type of acid selected from acids each having an acid dissociation constant (pKa) in the range of 4 to 8.

* * * * *